(12) United States Patent
Brueck et al.

(10) Patent No.: US 8,145,233 B2
(45) Date of Patent: Mar. 27, 2012

(54) METHODS OF POWER OVERLOAD CONTROL IN COMMUNICATION SYSTEMS

(75) Inventors: Stefan Brueck, Nuremberg (DE); Jens Mueckenheim, Nuremberg (DE); Patrick Charriere, Tetbury (GB)

(73) Assignee: Alcatel Lucent, Paris (FR)

( * ) Notice: Subject to any disclaimer, the term of this patent is extended or adjusted under 35 U.S.C. 154(b) by 1150 days.

(21) Appl. No.: 11/980,421

(22) Filed: Oct. 31, 2007

(65) Prior Publication Data

US 2008/0096576 A1 Apr. 24, 2008

(51) Int. Cl.
*G06F 15/16* (2006.01)
(52) U.S. Cl. .......................... 455/453; 370/230
(58) Field of Classification Search ............ 455/423, 455/446, 452.2, 453; 370/230, 332, 335
See application file for complete search history.

(56) References Cited

U.S. PATENT DOCUMENTS

| | | |
|---|---|---|
| 2003/0032439 A1 | 2/2003 | Harris et al. |
| 2004/0157618 A1 * | 8/2004 | Brouwer .................. 455/453 |

FOREIGN PATENT DOCUMENTS

| | | |
|---|---|---|
| DE | 102 41 359 A1 | 3/2004 |
| WO | WO 02/082685 A1 | 10/2002 |

OTHER PUBLICATIONS

European Search Report dated Jul. 27, 2005.

* cited by examiner

*Primary Examiner* — Sam Bhattacharya
(74) *Attorney, Agent, or Firm* — Harness, Dickey & Pierce, P.L.C.

(57) ABSTRACT

Methods of providing power overload control in a communication system having a least one base station serving one or more users of at least one cell are described which may avoid an overload condition in the system. In one aspect, a target signal-to-interference ratio ($SIR_{target}$) may be controlled for inner loop power control implemented by the base station, so as to maintain the loading of the communication system below an overload condition. In another aspect, a target block error rate ($BLER_{target}$) may be controlled for outer loop power control implemented by the base station, so as to maintain the loading of communication system below an overload condition.

8 Claims, 5 Drawing Sheets

METHODS OF POWER OVERLOAD CONTROL IN COMMUNICATION SYSTEMS

BACKGROUND OF THE INVENTION

1. Field of the Invention

The present invention is generally related to power overload control in communication systems.

2. Description of the Related Art

Third generation (3G) wireless communication systems such as Code-Division-Multiple-Access (CDMA) networks and Universal Mobile Telecommunication Systems (UMTS) typically may include a plurality of mobiles having transceivers communicating with transceivers of serving base stations. Each mobile transceiver may include a transmitter and a receiver which communicate with a corresponding base station receiver or transmitter via one or more links. A link typically may comprise a plurality of communication channels such as signalling channels and traffic channels, for example. Traffic channels are communication channels through which users convey (i.e., transmit and/or receive) user information. Signalling channels may be used by the system equipment to convey signaling information used to manage, operate and otherwise control the system. The system equipment, which may be typically owned, maintained and operated by a service provider, may include various known radio and processing equipment used in communication systems. The system equipment along with user equipment (UE), e.g., mobiles, generate and receive the signaling information.

Communication signals transmitted and received via communication links may often be distorted by various anomalies that exist in the communication channels. These channel anomalies may cause the signals to be received erroneously. For example, channel anomalies such as path loss, Rayleigh fading, frequency translation and phase jitter may often cause the signals to lose power, so that a signal is received at a significantly lower power level than it was transmitted. As a result, signals adversely affected by channel anomalies may often be received with errors. One way of preventing errors from occurring, or at least to reduce the likelihood of errors occurring, is by applying power control techniques to these communication systems.

In general, a power control algorithm may be performed at a base station. In looking at a signal received from a mobile, if the signal looks weak (e.g., based on detected frame error rate (FER), for example), the base station may send a command to either increase or decrease mobile station transmit power. For example, a comfortable level of quality in a voice system may be possible with a FER of approximately 1%. If FER is much less than (<<) 1%, the mobile station may be wasting power, so the power control algorithm implemented at the base station may send commands to the mobile requesting the mobile to reduce the transmit power. For FER much greater than (>>)1%, the level of quality may be degraded, so the base station may send a command to the mobile to bring the mobile transmit power up in order to restore quality.

Typically, in order to effect power control at the base station, two power control loops may be utilized, which together provide what is referred to as 'closed-loop power control': inner loop power control and outer loop power control. In an exemplary CDMA communication system, for example, an inner loop power control algorithm ('inner loop' or 'fast power control'), which may operate at a speed of 800 Hz, for example), may be used to adjust the power at the transmitter. Thus, a base station measures a received signal to noise ratio ($E_b/N_t$), also known as a signal to interference ratio (SIR), and compares the SIR value to a threshold. The threshold may be used by the inner loop to determine a specified quality of service (QoS) for power control. If the received SIR is too high (e.g., above the threshold), the base station transmitter may send a down power command to the mobile station, and vice versa where measured SIR is too low.

QoS may be representative of a number of different service requirements. For example, QoS may be indicative of providing guaranteed performance (e.g., such as a minimum or maximum data network throughput, a minimum delay requirement, a packet loss rate, and/or a packet download time, etc.) in a given network such as UMTS. A system or network such as a UMTS or CDMA system may be designed to support several quality of service (QoS) levels to allow efficient transfer of non real-time traffic (e.g., intermittent and/or bursty data transfers, occasional transmission of large volumes of data) and real-time traffic (e.g. voice, video), etc.

However, a communication path between base station and a mobile station is not often line of sight (LOS), and may be constantly changing due to the motion of the mobile station, or due to the mobile station's surroundings. For example, SIR changes may be caused by fast fading (like Rayleigh or Ricean fading), by shadowing (log-normal fading) and/or by changes in the interference level. Ideally, the received SIR should remain constant to enable a good reception of the reverse link signal (from the mobile to base station) without wasting transmit power at the mobile station.

Thus, the radio channel conditions between the base station and a mobile may be constantly changing. As the radio conditions change, the threshold may be adjusted in order to maintain the QoS of the radio link. The system that performs the function of adjusting the threshold (e.g., setting and adjusting the set point of the threshold) is referred to as the outer loop power control ('outer loop' or 'slow power control'). Together with the inner loop, the outer loop forms the closed loop power control.

Outer loop power control may be designed to control the current link quality in terms of a bit-error rate (BER) or a block error rate (BLER), depending on requirements of the radio bearer service. Although the SIR is controlled by the inner loop power control, the received link quality may still change. As discussed above, these changes may be caused by variations in the multi-path delay profile (typical urban, hilly terrain, etc.), alterations in the speed of the mobile and/or modifications in the interference characteristics. The outer loop power control thus may adapt a 'target SIR' of the inner loop (such as by adjusting the set point of the threshold) so that the required link quality may be achieved.

In CDMA systems such as UMTS, there is thus a need for a power control mechanism or algorithm to overcome path loss effects, and to balance the quality of service (QoS) between the various user services. However, in certain situations, a CDMA system may become overloaded.

Figure 1:
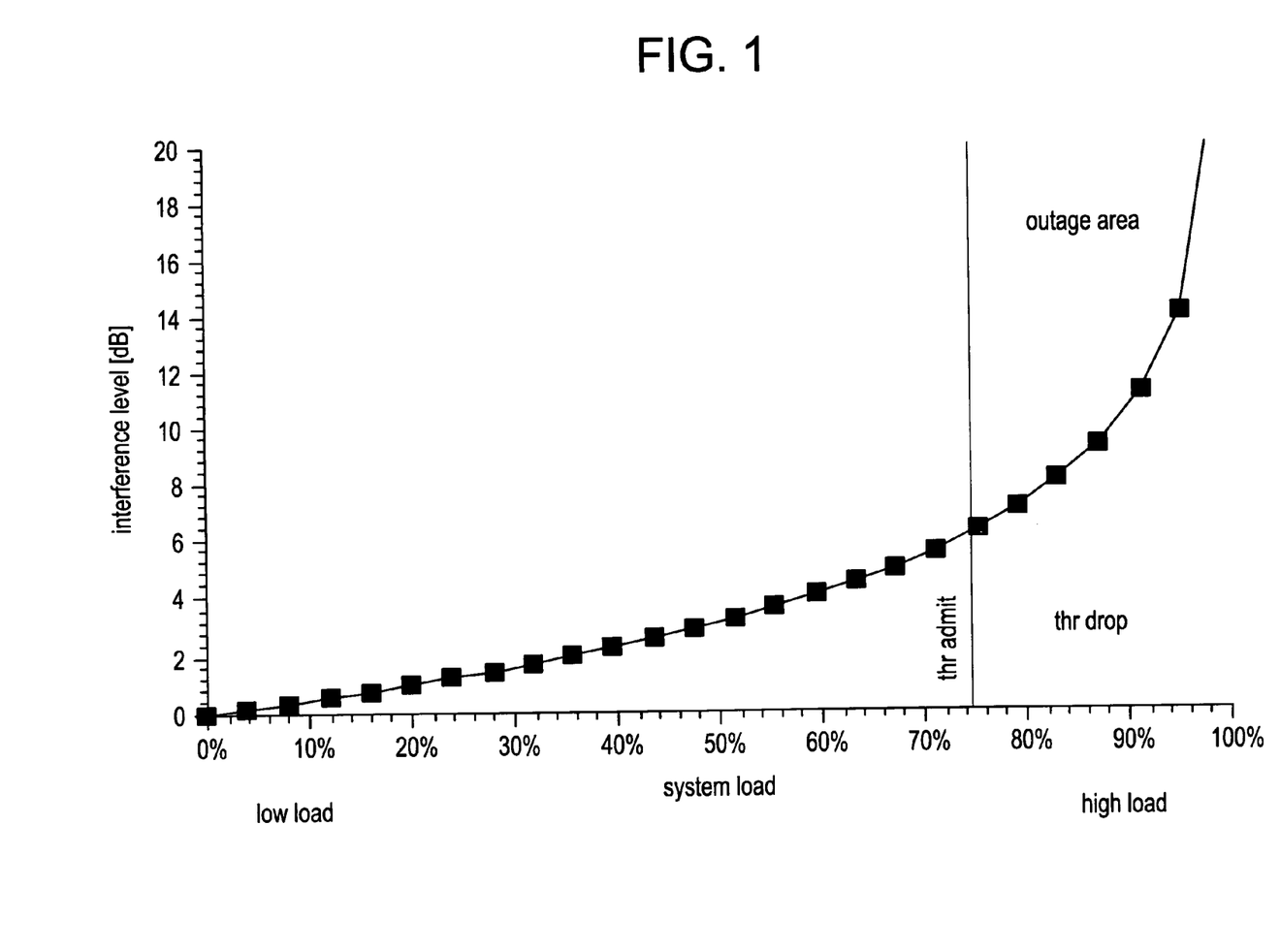
FIG. 1 is a graph to illustrate the overload problem in communication systems such as UMTS.

FIG. 1 is a graph to illustrate the overload problem in communication systems such as UMTS. Referring to FIG. 1, as load reaches 100%, the interference and transmit power for each mobile user may rapidly increase. In the high-load region, power control may not be effective, leading to unstable operation of the network. In a worst case scenario, a transmit power limit may have been reached, which could possibly lead to a drop of the connection, due to loss of synchronization between mobile and base station. To prevent an occurrence of this, efficient overload control algorithms are desired in CDMA networks such as UMTS.

Conventional methods for addressing power overload events or situations in wireless communication systems may include: (a) load or overload control; and (b) the aforementioned closed loop power control. Overload control may typically be employed in networks such as UMTS. Referring again to FIG. 1, it is desirable that the right-most region of loading should be avoided, because at this point, the network or system may become unstable due to a rapid increase in both the interference and transmit power. In FIG. 1, the region to be avoided may thus be referred to as an 'outage area'.

In general, the following conventional methods may be employed to address the overload control problem in CDMA networks. One technique is referred to as Call Admission Control (CAC). CAC functionality attempts to avoid an overload situation by controlling the access of new users to the network or system. The basic CAC functionality thus operates so as to not admit (i.e. block) a new user into the system, if the load becomes greater than a given threshold ($thr_{admit}$), as illustrated in FIG. 1, for example.

Another conventional method addressing overload may be referred to as 'congestion control' (ConC). Even with a properly functioning CAC routine, a wireless communication system may become overloaded due to the mobility of mobile users in the system. In such a case, ConC functionality may facilitate overcoming the overload situation. Referring again to FIG. 1, and in general, ConC methodology may interrupt (i.e. drop) an existing connection, if the load exceeds a second given threshold ($thr_{drop}$). The $thr_{drop}$ threshold typically may be set to a greater value then $thr_{admit}$. Accordingly, use of the above overload control methods (CAC and/or ConC) may lead to a relatively harsh reaction for users in a UMTS or CDMA system, if the system is in an overload situation.

Another radio resource management function related to overload control may be closed loop power control. Power control (PC) algorithms implemented at the base station may control the setting of the transmit power in order to (a) maintain system QoS within required limits, e.g., data rate, delay, BLER, etc.; and (b) to reduce and/or minimize interference, i.e., overall power consumption. PC may address propagation effects, like path loss (near-far-problem), shadowing (log-normal-fading) and fast fading (Rayleigh-fading, Ricean-fading), as well as the impact of the environment (delay spread, UE speed, etc.) on the wireless communication system.

Figure 2:
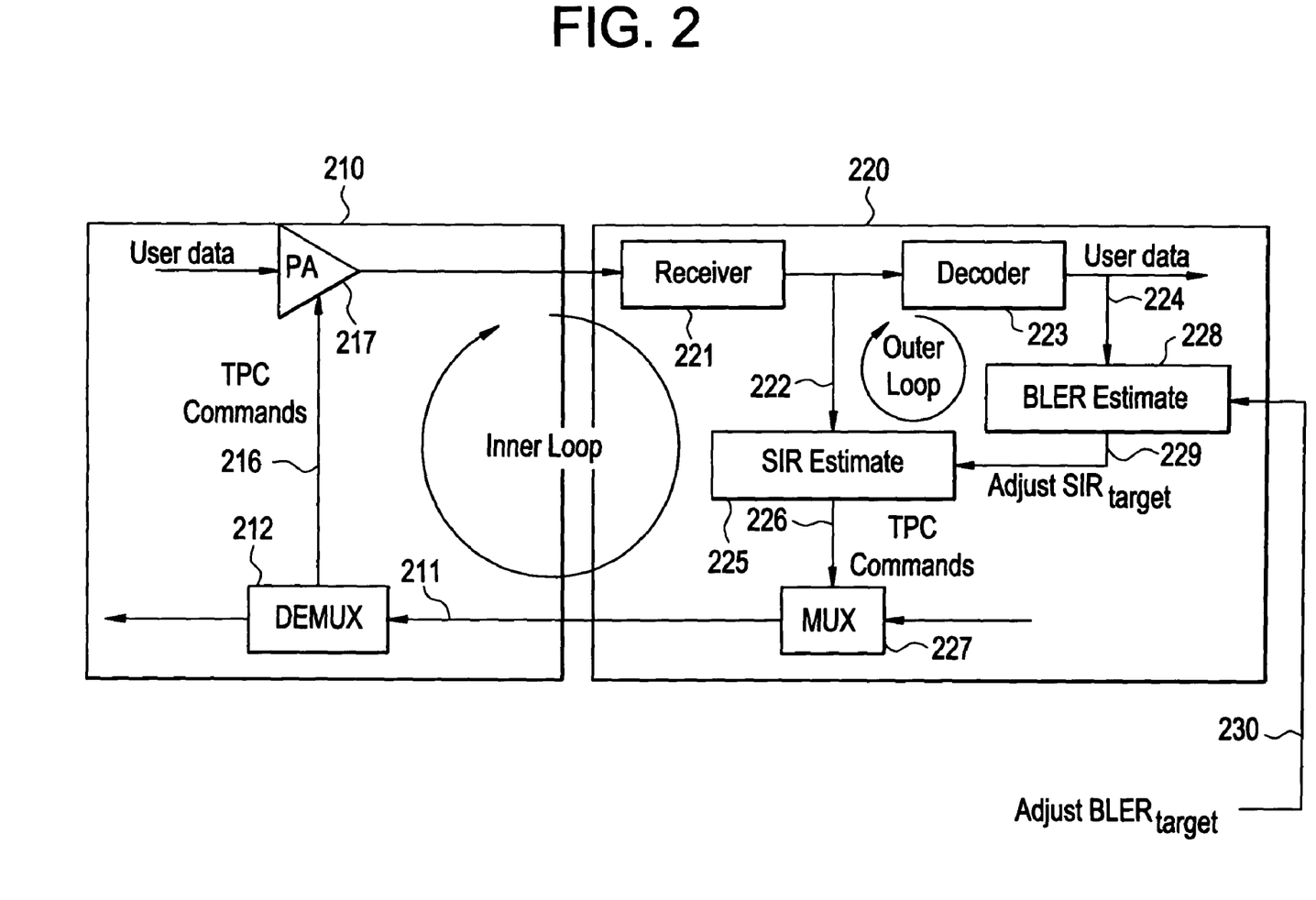
FIG. 2 illustrates a block diagram of conventional closed loop power control (CLPC) in a base station transceiver of a wireless communication system.

FIG. 2 illustrates a block diagram of conventional closed loop power control (CLPC) in a base station transceiver of a wireless communication system. As discussed above, CLPC may include inner loop power control (ILPC) and outer loop power control (OLPC). As shown in FIG. 2, there is shown a block diagram of a transmitter side 210 of a user such as a UE and a receiver side 220 of a base station transceiver (hereafter the terms 'base station' and 'NodeB' may be occasionally interchanged).

The ILPC controls the transmit power settings of the transmitter side 210 in order to achieve a desired or given $SIR_{target}$, which has been adjusted by the OLPC. Referring to FIG. 2, the basic function of ILPC may be as follows. At the receiver side 220 of the NodeB, the SIR of a given UE may be estimated (at 225) from a signal 222 received via receiver 221. The received signal 222 may be compared against $SIR_{target}$ at element 225. Based on the comparison, transmit power control (TPC) commands 226 may be generated. For example, if $SIR<SIR_{target}$, the ILPC of a given NodeB may generate a 'power up' command to the UE that it is serving; if $SIR>=SIR_{target}$, the ILPC of a given NodeB may generate a 'power down' command to the UE.

The TPCs 226 may be multiplexed by a suitable MUX 227 into a data stream 211 sent to the associated transmitting side 210 of the UE. The transmitter side 210 extracts the TPC commands 226 from the associated data stream 211 at a suitable DEMUX 212. The transmitter side 210 may adjust the transmit power of a power amplifier (PA) 217 therein based on the extracted TPC commands received from DEMUX 212 via line 216. For example, when a power up command has been received from receiver side 220, the transmit power of the UE may be increased by a given amount; after reception of a power down command, the transmit power may be decreased by a given amount. ILPC is thus a closed loop between the transmitter side 210 of the UE and receiver side 220 of the NodeB.

The OLPC controls the $SIR_{target}$ setting (threshold) for ILPC in order to fulfill the QoS requirement of the service, which may be given, for example, by a certain $BLER_{target}$ 230. Referring to FIG. 2, the basic function of OLPC may be as follows. Within the receiver side 220, the QoS of the service (e.g. the BLER) may be estimated (at 228) from the decoded signal 224 (decoded by decoder 223) and compared against a QoS target (e.g. given by $BLER_{target}$). An adjusted $SIR_{target}$ for ILPC may be determined (see line 229) based on the comparison at 228. For example, when $BLER>BLER_{target}$, OLPC increases $SIR_{target}$, and when $BLER<=BLER_{target}$, OLPC decreases $SIR_{target}$. The revised $SIR_{target}$ (threshold) may be provided to ILPC. OLPC is also a closed loop, which primarily runs within the receiver side 220 of the NodeB.

In the uplink ('reverse link', mobile to base station) power control is performed for each mobile user, separately, while in the downlink ('forward link', base station to mobile) power control runs per physical channel. In current realizations, no specific power control action is performed when a power overload situation occurs. In an overload situation, conventional power control increases the transmit power to the transmit power limit, even if the desired or target BLER has not yet been reached or met. This may lead to unexpected droppings of existing connections, as the synchronization between transmitter and receiver has been lost.

Figure 3:
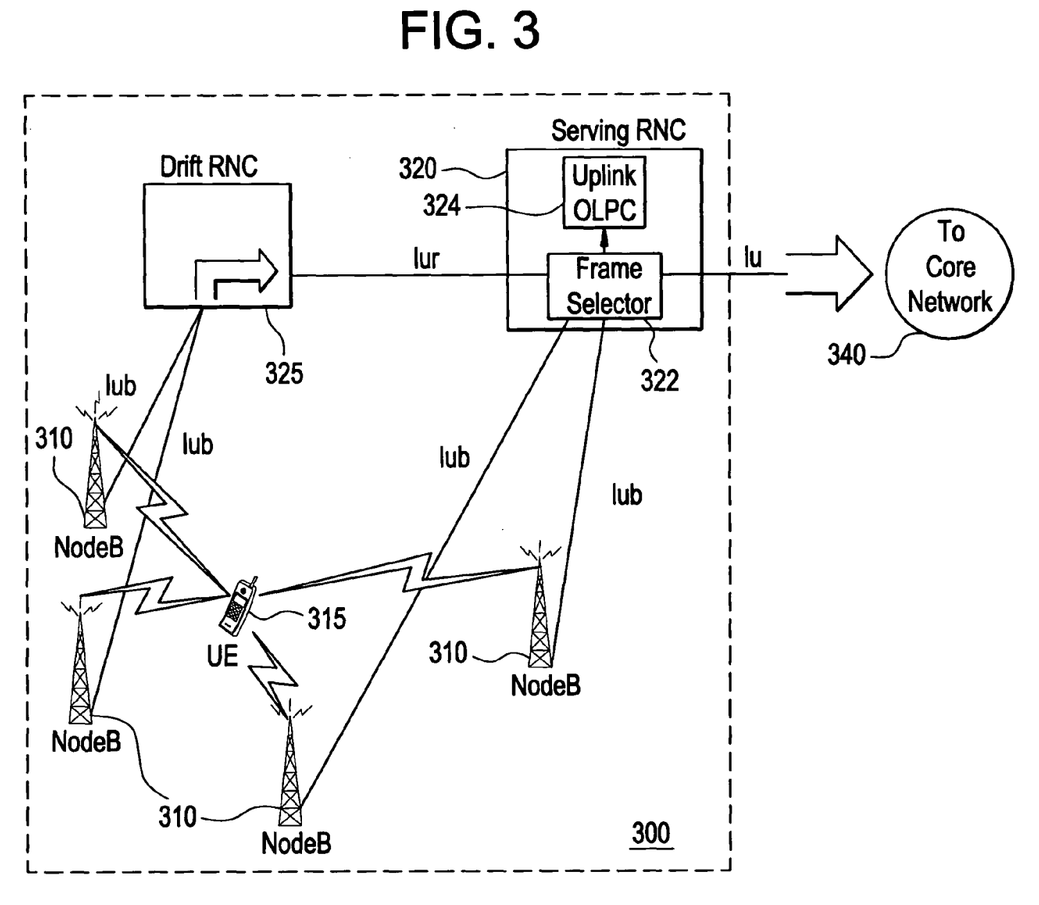
FIG. 3 illustrates a conventional arrangement for uplink power control in a wireless communication system.

FIG. 3 illustrates a conventional arrangement for uplink power control in a wireless communication system. System 300 may be embodied as a UMTS Terrestrial Radio Access Network (UTRAN) 300, for example. UTRAN 300 may include cell sites, called Node Bs 310 (base stations), which may serve one or more UEs 315, generally using a Uu interface protocol. A Node B 310 may contain radio transceivers that communicate, using Iub protocol, with radio network controllers (RNCs) 320 and 325. Here, RNCs are shown as the controlling, or serving RNC (SRNC) 320 and a drift RNC (DRNC) 325 of the UTRAN 300. The SRNC 320 and DRNC 325 may communicate with each other using an Iur protocol, for example.

UTRAN 300 may also interface with one or more core networks (CNs) 340 (only one being shown in FIG. 3 for simplicity). Although not shown for reasons of brevity, CN 340 may include mobile switching centers (MSCs), one or more Serving GPRS Support Nodes (SGSNs) and one or more Gateway GPRS serving/support nodes (GGSNs). SGSNs and GGSNs are gateways to external networks (not shown). In general in UMTS, SGSNs and GGSNs may exchange packets with mobile stations over the UTRAN 300, and may also exchange packets with other internet protocol (IP) networks, referred to herein as packet data networks (PDNs). External networks may include various circuit networks such as a Packet Switched Telephone Network (PSTN) or an Integrated Service Digital Network (ISDN) and PDNs.

As shown in FIG. 3, UTRAN 300 may be linked to CN 340 via suitable Iu interfaces such as Iu cs and Iu ps (not shown for clarity), for example. Alternatively, UTRAN 300 may be linked to the CN 340 via back-haul facilities (not shown) such as T1/E1, STM-x, etc., for example. Ics, short for Interface Unit (Circuit Switched) interface, is the interface in UMTS which links the RNC with a MSC. Ips, short for Interface Unit (Packet Switched) interface, is the interface in UMTS which links the RNC with a SGSN.

According to the 3GPP UMTS standard such as 3GPP TS 25.401, V6.2.0 (2003-12), entitled "UTRAN overall description), the different uplink PC functions may be located in different network entities. FIG. 3 illustrates an example for the location of uplink control functions in a case of soft handoff between NodeBs 310. Soft handover is a call configuration whereby the UE is simultaneously connected to more than one cell. In this example, the UE 315 is connected to different NodeBs 310 and different RNCs 320 and 325, with each NodeB 310 connected to an associated controlling RNC 320/325 via the Iub interface. If the controlling RNCs are different for the NodeB 310 involved in soft handoff, one RNC takes the part of SRNC 320 for controlling the connection, while the other acts as a DRNC 325. As shown, UE 315 data and control flows between RNCs 320/325 may be transmitted via the Iur logical interface.

Conventionally, the ILPC function is located in each NodeB 310, thus providing separate ILPC loops between a given UE 315 and each NodeB 310. The 3GPP UMTS standard provides specified rules for the UE 315, in a case where the TPC commands from these separate loops are in conflict. The frame selector 322 may be adapted to select the most reliable data stream between the different uplink soft handover paths that reach the SRNC 320, and may be located in the SRNC 320. Also, OLPC functionality 324 may typically also be located in SRNC 320, as shown in FIG. 3, for example.

Accordingly, conventional power control implementations do not present an efficient way of addressing and handling overload conditions, particularly in the uplink. For example, for a short term overload, such as a few tenths of a second, for example, any action by the PC may be too harsh, adversely affecting users by blocking or dropping users as currently done by conventional overload control algorithms such as CAC and/or ConC.

Further, in the case where no action is done in response to an overload situation, the power control loops for a given number of users may reach corresponding limits, which could lead to unexpected and uncontrolled performance degradation for the service. In the extreme case, synchronization between a given UE 315 and its serving NodeB 310 may be lost and the call dropped.

SUMMARY OF THE INVENTION

An exemplary embodiment of the present invention is directed to a method of providing power overload control in a communication system having a least one base station serving one or more users of at least one cell. In the method, a target signal-to-interference ratio ($SIR_{target}$) may be controlled for inner loop power control implemented by the base station, so as to maintain the loading of the communication system below an overload condition.

Another exemplary embodiment of the present invention is directed to a method of providing power overload control in a communication system having a least one base station serving one or more users of at least one cell. In the method, a target block error rate ($BLER_{target}$) may be controlled for outer loop power control implemented by the base station, so as to maintain the loading of communication system below an overload condition.

BRIEF DESCRIPTION OF THE DRAWINGS

The exemplary embodiments of the present invention will become more fully understood from the detailed description given herein below and the accompanying drawings, wherein like elements are represented by like reference numerals, which are given by way of illustration only and thus are not limitative of the exemplary embodiments of the present invention.

DETAILED DESCRIPTION OF THE EXEMPLARY EMBODIMENTS

Although the principles of the exemplary embodiments of the present invention are particularly well-suited for wireless communication systems based on UMTS technologies, standards and techniques, and will be described in this exemplary context, it should be noted that the exemplary embodiments shown and described herein are meant to be illustrative only and not limiting in any way. For example, the exemplary embodiments of the present invention is also applicable to the well-known IS-95, IS 2000 and/or CDMA 2000 technologies for communication systems. As such, various modifications will be apparent to those skilled in the art for application to other wireless communication systems and are contemplated by the teachings herein.

Additionally where used below, the term 'user equipment' (UE) may be considered synonymous to a mobile station, mobile, mobile user, subscriber, user, remote station, access terminal, etc., and may describe a remote user of wireless resources in a wireless communication network. The term 'NodeB' may be considered synonymous to a base station or base transceiver station (BTS), and may describe equipment that provides data and/or voice connectivity between a network and one or more UEs. A system or network (such as an access network) may include one or more base stations.

Exemplary embodiments of the present invention may be directed to methods of power overload control in the uplink, although the exemplary methods may be applicable to addressing an overload situation in the downlink, as would be evident to one having ordinary skill in the art. The exemplary methodology described hereafter may be applicable in lieu of, and/or in addition to, conventional load control methodologies such as Call Admission Control (CAC) and Congestion Control (ConC), for example.

In general, the exemplary methodologies described herein for implementing power overload control in wireless communication systems may be based on a principle that an overload situation may occur for a finite time in communication systems supporting a specific load that is below a maximum load limit. Therefore, it may be desirable to restrict the QoS for users served by the system in terms of, e.g., increasing the BLER for a finite period, instead of implementing a more drastic action such as blocking a new user or dropping an existing user, as is done in conventional load control methodologies such as CAC and ConC.

As will be described in further detail hereafter, in an exemplary embodiment, a target signal-to-interference ratio ($SIR_{target}$) for ILPC may be controlled so as to maintain the communication system below an overload condition. This may be done based on knowledge that transmit power, and hence overall loading of a system, may depend directly on an adjusted $SIR_{target}$ for inner loop power control.

As will be described in further detail in another exemplary embodiment, the target block error rate ($BLER_{target}$) for ILPC may be adjusted based on the system load at a given instant. Accordingly, another exemplary embodiment is directed to a method for power overload control in which $SIR_{target}$ for ILPC may depend on $BLER_{target}$, via OLPC functionality.

Figure 4:
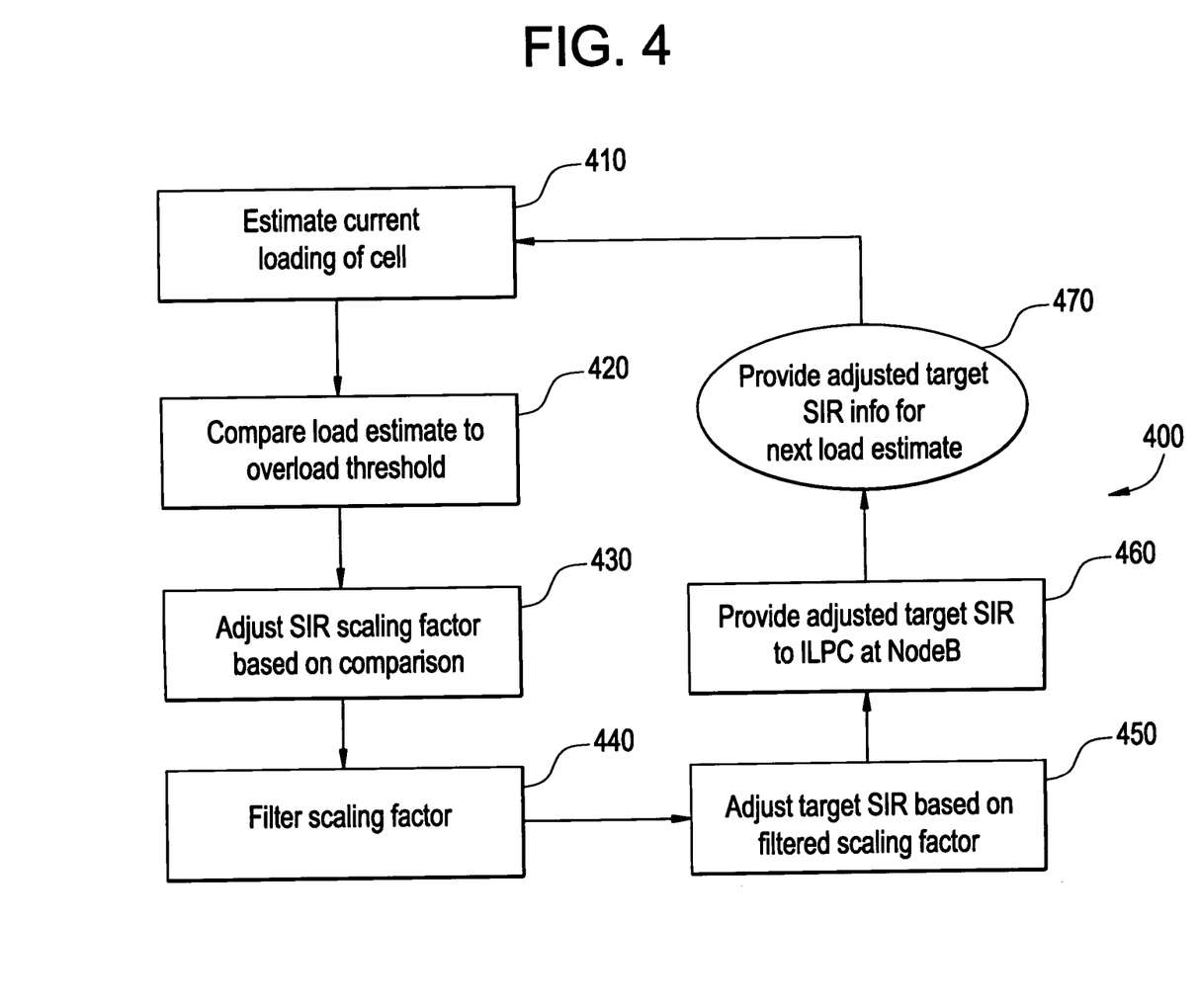
FIG. 4 is a flow diagram illustrating a method for power overload control in a communication system in accordance with an exemplary embodiment of the present invention.

FIG. 4 is a flow diagram illustrating a method for power overload control in a communication system in accordance with an exemplary embodiment of the present invention. In general, FIG. 4 illustrates a method for overload control that may be based on controlling the $SIR_{target}$ for inner loop power control.

Referring to FIG. 4, a 'power overload control loop' 400 may be implemented in addition to ILPC. In a CDMA or UMTS system, the $SIR_{target}$ which is controlled by the ILPC, may have an influential impact on the interference, and hence loading, of a given cell (where a cell may include one or more UEs served by a NodeB).

On one hand, lowering the $SIR_{target}$ may also reduce the load of the cell, and therefore may facilitate overcoming a temporary overload situation. On the other hand, a lower $SIR_{target}$ may also degrade BLER performance of the communication system. Hence, the QoS may also be degraded during an overload period or situation. The exemplary methodologies described herein account for the trade-off between the ability to overcome an overload situation and the potential degradation to system performance.

Referring to FIG. 4, a NodeB may regularly estimate (S410) the current loading of a given cell. In the uplink, this loading may be based on an overall received interference. For example, the NodeB may monitor the load by measuring the cell interference level for a given cell it is serving. The estimated uplink load may be utilized by loop 400 in lieu of or in addition to other load control functionalities such as CAC and ConC, for example. For the example of FIG. 4, load estimates for one or more UEs in each cell may be reported by the serving NodeB to the controlling RNC of a network such as a UTRAN, for example.

In order to detect an overload situation at the NodeB, the estimated load may be compared (S420) against a given overload threshold ($thr_{overload}$). Based on the comparison, a SIR scaling factor ($fac_{SIR}$) may be adjusted (S430). For example, if estimated load is equal to or exceeds (>=) $thr_{overload}$, $fac_{SIR}$ may be reduced by a given amount (i.e., by a percentage or set value that does not lower the $fac_{SIR}$ below a given minimum value ($min(fac_{SIR})$). If the estimated load is less than (<) $thr_{overload}$, the $fac_{SIR}$ may be raised on incremented by a given amount (i.e., by a percentage or set value that does not raise the $fac_{SIR}$ above a given maximum value ($max(fac_{SIR})$). In this example, $max(fac_{SIR})$ may be =1, although one or ordinary skill in the art may use other values for $max(fac_{SIR})$, such as a fraction, decimal, integer other than 1 and the like.

In order to avoid instabilities when determining a target SIR, the scaling factor $fac_{SIR}$ may be filtered (S440). For example, a relatively simple forgetting factor may be applied in accordance with exemplary expression (1):

$$fac_{SIRave}(i) = (1-a) \cdot fac_{SIRave}(i-1) + a \cdot fac_{SIR}(i). \quad (1)$$

In expression (1), $fac_{SIRave(i)}$ may represent a current output value after filtering, $fac_{SIRave(i-1)}$ may represent the previous output value, 'a' may represent a filter coefficient, and $fac_{SIR(i)}$ may represent the current scaling factor value obtained from S430.

Based on the determination of $fac_{SIRave(i)}$ in S440, a target $SIR_{target}$ for the ILPC may be adjusted (S450) as set forth in exemplary expression (2):

$$SIR_{target} = SIR_{targetOLPC} \cdot fac_{SIRave}. \quad (2)$$

In expression (2), $SIR_{targetOLPC}$ represents the original target SIR as adjusted by OLPC. The revised value for $SIR_{target}$ may thus be provided (S460) to the ILPC implemented by the NodeB. If the $SIR_{target}$ was lowered (as compared to the current $SIR_{target}$ implemented by the ILPC methodology in the NodeB) due to the above iterations S410-S460, then the ILPC implemented at the NodeB may reduce commanded transmit power via the conventional operation, i.e., by sending a suitable power down command to the UE. Hence, the offered load (if approaching or at a power overload condition) may be reduced in an efficient manner. Further, information related to the impact of the revised $SIR_{target}$ on system performance may be used (S470) to determine a next load estimate at S410 at another time instant, for example. The details of ILPC operations have been generally described above, thus a detailed description here is omitted for sake of brevity.

Accordingly, the exemplary methodology may be efficiently applied in the NodeB, where cell load information for deciding on $SIR_{target}$ may be available, so that any latency between power overload control and ILPC may be kept relatively low. In an effort to make the load reduction even more efficient, the power overload control loop shown in FIG. 4 may be employed for all UEs of a cell or at least a group of UEs in that cell. In the case of soft handoff, only the $SIR_{target}$ setting of the cell which is in overload is affected.

In the case where $SIR_{target}$ is lower than $SIR_{targetOLPC}$, without any further action the OLPC would increase $SIR_{targetOLPC}$ again because the target quality, in terms of $BLER_{target}$, for example, would not have been reached. This effect may be referred to as the 'wind up' effect, which may pose a serious problem in CDMA systems such as UMTS.

To avoid the wind-up effect, the OLPC should be informed of the target quality ($BLER_{target}$), so as to prevent the OLPC implemented by the NodeB from unnecessarily raising $SIR_{targetOLPC}$. By applying the distributed OLPC architecture and a suitable power control signalling method, such as is described in European Patent Application No. 01309520.3 (published as EP1311076), to Charriere et al, filed Nov. 12, 2001 and entitled "Control of the transmission power of a CMDA based system", this signalling may be inherently given. The contents of EP1311076, as related to the described power control signaling method, are incorporated by reference herein.

The impact of certain given parameters of the power overload control methodology on system performance may be explained as follows. The overload threshold $thr_{load}$ may directly provide the point of loading to the NodeB, or in other words, the trigger at which the exemplary power overload control methodology described herein should be initiated. The overload threshold $thr_{load}$ should be adjusted according to the maximum allowable loading of the cell, which is given by an overload threshold $thr_{CAC}$ for CAC and an overload threshold $thr_{ConC}$ for ConC, for example.

CAC and ConC functionality may still be needed to overcome massive overload situations, especially if they last more than a few seconds, where power overload control may potentially lead to unacceptable BLER performance for UEs of a given cell. A minimum bound such as $min(fac_{SIR})$ may be used to adjust a worst allowable quality limit for a specific service, for example. The filter coefficient a described in expression (1) may have a substantial impact on the dynamics of power overload control. Further, there may be a trade-off between the ability to overcome the overload situation, and potential QoS degradation by adjusting one or more of the $thr_{load}$, the $min(fac_{SIR})$ and the filter coefficient a.

Figure 5:
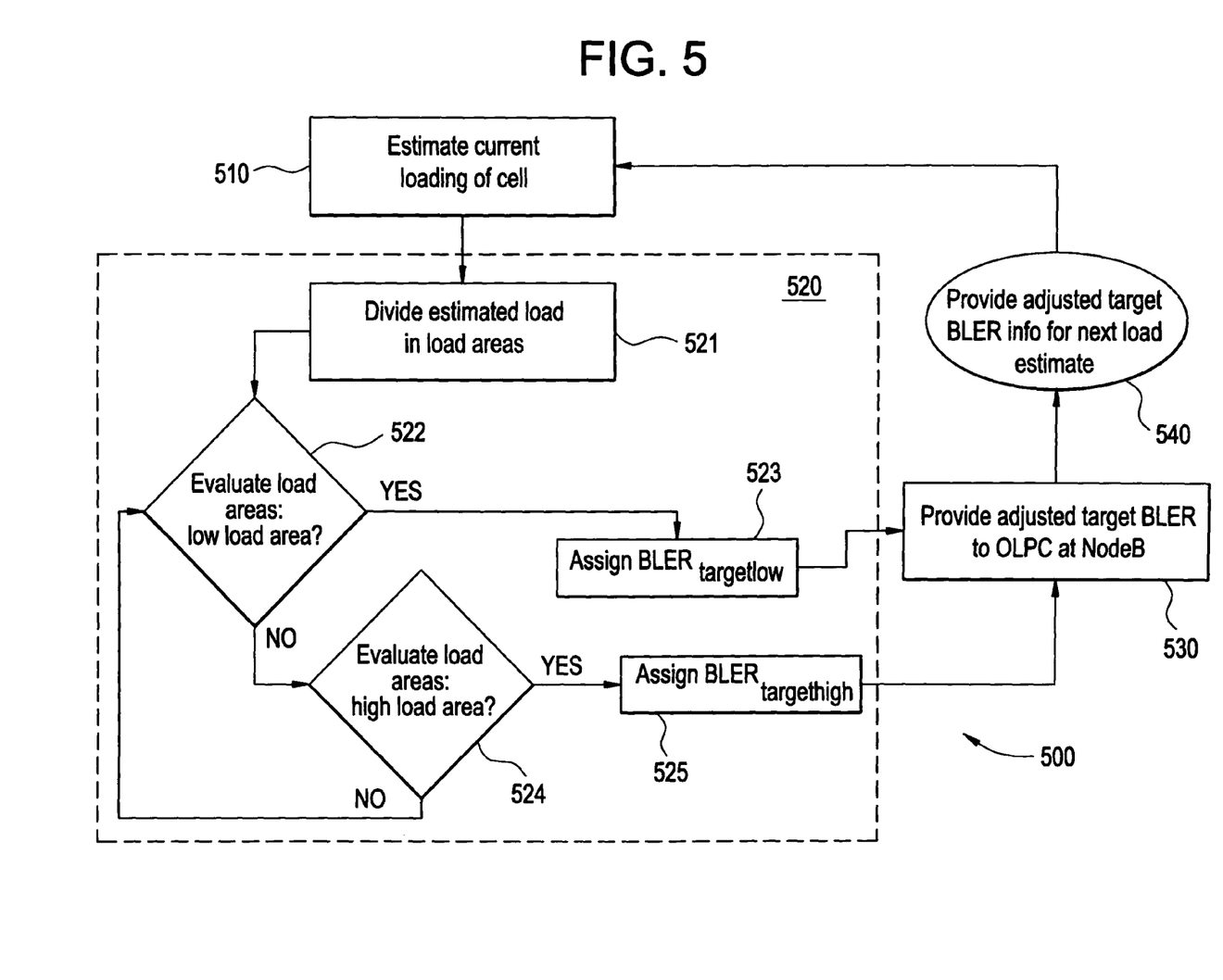
FIG. 5 is a flow diagram illustrating a method for power overload control in a communication system in accordance with another exemplary embodiment of the present invention.

FIG. 5 is a flow diagram illustrating a method for power overload control in a communication system in accordance with another exemplary embodiment of the present invention. In general, FIG. 5 illustrates overload control that may be based on setting the $BLER_{target}$ for outer loop power control. In CDMA systems, the BLER of a given service may have an influential impact on the transmit power, via the OLPC and ILPC implemented at the NodeB, and hence, may substantially impact loading of a given cell.

Referring to FIG. 5, a NodeB may regularly estimate (S510) the current loading of a given cell that one or more UEs are connected to. In the uplink, this loading may be based on an overall received interference. The estimated uplink load may be utilized in lieu of or in addition to other load control functionalities such as CAC and ConC, for example. For the example of FIG. 5, load estimates for one or more UEs in each cell may be signalled by the serving NodeB to the controlling RNC of a network such as a UTRAN, for example.

The load estimated may be utilized to determine an adjustment (S520) to the $BLER_{target}$. To set or adjust the $BLER_{target}$, the estimated load may be divided into several areas (S521), with defined $BLER_{target}$ settings for each area, depending on the requested service. In a simple example, two areas may be assumed, it being understood that fewer or greater areas then two may be defined by one having ordinary skill in the art. Two exemplary load areas may be defined as a 'low load' area and 'high load' area, for example. Each area may have a specified $BLER_{target}$ setting, for example. The association between the areas and the determination of an adjustment to $BLER_{target}$ may be described as described below.

If the area is determined to be a low load area (output of S522 is YES), then assign $BLER_{targetlow}$ (S523). If the area is determined to be a high load area (output of S524 is YES), then assign $BLER_{targethigh}$ (S525). In an aspect, it may be desirable to set $BLER_{targetlow}<BLER_{targethigh}$, since the load/power consumption decreases as the BLER target increases. The revised or adjusted value for $BLER_{target}$, based on the area evaluated, may be provided (S530) to the OLPC implemented by the NodeB, as shown in FIG. 5.

The methodology described in FIG. 5 may be initiated at the beginning of a new service for getting an initial $BLER_{target}$, and/or during the existence of a selected service by dynamically (i.e., in essentially real time) updating $BLER_{target}$. Because the end user perceived performance may be affected, it may be desirable to implement the methodology of FIG. 5 for only certain types of calls in a given cell. The decision as to which UE to submit to the methodology of FIG. 5 may be based on the QoS requirement of the service or on some other priority or parameter, for example. In the case of soft handoff, all links may be affected from the new $BLER_{target}$ setting.

The methodology as described in FIG. 5 may be efficiently applied in the RNC, where the quality information for the service, e.g. the BLER, may be available due to the location of the frame selection function in UMTS (see frame selection function 322 in FIG. 3, for example). Furthermore, general load information (e.g., load information of adjacent cells) which may be used for determining an adjusted $BLER_{target}$ setting, may also be available in the RNC. Due to the general long-term nature of the $BLER_{target}$ adjustment, any latency between NodeB and RNC is not relevant to $BLER_{target}$ adjustment. The $BLER_{target}$ adjustment methodology may be efficiently supported by the distributed OLPC architecture and power control signalling method, as described in EP Application No. 01309520.3.

The exemplary embodiments may provide several benefits within the realm of power control in wireless communication systems. For example, the exemplary methodology described in FIG. 4 may efficiently address a short term overload situation by temporarily lowering the $SIR_{target}$ for the ILPC. This may avoid the need for more drastic measures such as blocking a new call or dropping an existing call, as implemented by conventional CAC and ConC functionalities. Additionally, by the selection of given parameters such as one or more of the $thr_{load}$, the $min(fac_{SIR})$ and the filter coefficient a, the methodology as described in FIG. 4 may achieve a desired trade-off between the ability for power overload control to overcome short term overload and QoS degradation due to worsening BLER performance, in the case where the adjusted $SIR_{target}$ results in a lower $SIR_{target}$.

If the methodology of FIG. 4 is combined with existing overload control methods such a CAC and ConC, long or longer-term overload situations may be overcome. In such a configuration, power overload control may be two-fold: firstly, where overload is short in time, power overload control may temporarily reduce QoS without affecting the user(s). Secondly, and if due to any reason the overload situation become of longer duration, CAC and ConC functionalities may be implemented to overcome a longer-term power overload situation by blocking or dropping calls. However, it may be expected that with power overload control, the thresholds for overload events may be set higher than would be without the enhanced overload control loop 400 of FIG. 4.

The methodology as described in FIG. 5 may provide a longer term adaptation of the QoS to the loading situation. If the load is lower, a higher QoS (in terms of lower $BLER_{target}$) can be given to specific users, than for higher loading, where larger $BLER_{target}$ may be more appropriate. Further, it is evident to one having ordinary skill in the art that the methodologies in FIGS. 4 and 5 may be combined to provide an efficient mechanism for addressing and processing load fluctuations by regulating the QoS of the requested service.

Moreover, although the methodology of FIG. 4 may be more suited for the uplink, because only in the uplink direction is a direct interface given to ILPC, the methodology of FIG. 5 may also be used in the downlink, because the OLPC targets for both directions may be set in the serving or controlling RNC of the UTRAN. Accordingly, the temporary reduction in quality may avoid unnecessary early dropping of calls. Hence, a higher capacity may be possible in the event of a power overload condition in a communication system such as UMTS, in light of the above-described methods for power overload control.

The exemplary embodiments of the present invention being thus described, it will be obvious that the same may be varied in many ways. For example, the logical blocks in FIGS. 12-5 may be implemented in hardware and/or software. The hardware/software implementations may include a combination of processor(s) and article(s) of manufacture. The article(s) of manufacture may further include storage media, computer-readable media having code portions thereon that are read by a processor to perform the method, and executable computer program(s). The executable computer program(s) may include instructions to perform the described operations and the method. The computer executable(s) may also be provided as part of externally supplied propagated signals. Such variations are not to be regarded as a departure from the scope of the exemplary embodiments of the present invention, and all such modifications as would be obvious to one skilled in the art are intended to be included within the scope of the following claims.

What is claimed:

1. A method of performing power overload control in a communication system, comprising:
estimating a loading of a given cell in the system;
dividing the estimated load into one or more load areas, each load area associated with a given target block error rate ($BLER_{target}$);
providing an adjustment to $BLER_{target}$ based on a given evaluated load area to control transmit power of users in the cell so as to prevent a power overload condition in the system.

2. The method of claim 1, wherein dividing includes dividing the estimated load into a first load area with an associated first $BLER_{target}$ value and a second load area with an associated second $BLER_{target}$ value.

3. The method of claim 2, wherein
the first load area represents an area of relatively high loading and the second load area represents an area of relatively low loading, and
the first $BLER_{target}$ value is greater than the second $BLER_{target}$ value.

4. The method of claim 2, wherein
the first load area represents an area of relatively low loading and the second load area represents an area of relatively high loading, and
the first $BLER_{target}$ value is less than the second $BLER_{target}$ value.

5. The method of claim 1, wherein providing includes providing an adjusted $BLER_{target}$ based on the given evaluated load area to outer loop power control implemented by a base station serving users of the at least one cell, the outer loop power control controlling quality of a link between the base station and cell so as to avoid a power overload condition.

6. A method of providing power overload control in a communication system having a least one base station serving one or more users of at least one cell, comprising:
estimating a load of a cell in the communication system;
dividing the estimated load into a plurality of load areas;
assigning a first target block error rate ($BLER_{target}$) to each load area determined as a low load area based on the divided estimated load associated with a respective load area;
assigning a second $BLER_{target}$ to each load area determined as a high load area based on the divided estimated load associated with a respective load area, the first $BLER_{target}$ having a value lower than that of the second $BLER_{target}$;
controlling a target $BLER_{target}$ for outer loop power control implemented by the base station based on the assigned first $BLER_{target}$ and assigned second $BLER_{target}$ so as to maintain the loading of the communication system below an overload condition.

7. The method of claim 6, wherein controlling further includes adjusting $BLER_{target}$ based on estimated loading of the cell so as to control power at which users transmit information to the base station.

8. The method of claim 6, wherein said controlling is implemented at the base station in addition to existing call admission control and congestion control functionalities to prevent the communication system from reaching an overload condition.

* * * * *

UNITED STATES PATENT AND TRADEMARK OFFICE
CERTIFICATE OF CORRECTION

PATENT NO. : 8,145,233 B2
APPLICATION NO. : 11/980421
DATED : March 27, 2012
INVENTOR(S) : Stefan Brueck et al.

Page 1 of 1

It is certified that error appears in the above-identified patent and that said Letters Patent is hereby corrected as shown below:

On the title page insert item (63),

-- (63)    Related U.S. Application Data

Divisional of application No. 10/835,112 filed on April 30, 2004, now Pat. No. 7,620,004. --

Signed and Sealed this
Twenty-ninth Day of May, 2012

David J. Kappos
*Director of the United States Patent and Trademark Office*